US012747938B2

(12) United States Patent
Sun et al.

(10) Patent No.: US 12,747,938 B2
(45) Date of Patent: Sep. 29, 2026

(54) MEASURING DEVICE FOR SINGLE GRASS TREE

(71) Applicants: ZHEJIANG A&F UNIVERSITY, Hangzhou (CN); LONGQUAN RESEARCH INSTITUTE OF FORESTRY, Longquan (CN); YUHUAN CITY NATURAL RESOURCES AND PLANNING BUREAU, Yuhuan (CN); HANGZHOU PERCEPTION TECHNOLOGY COMPANY LIMITED, Hangzhou (CN)

(72) Inventors: Linhao Sun, Hangzhou (CN); Luming Fang, Hangzhou (CN); Jingyong Ji, Longquan (CN); Haiping Sun, Yuhuan (CN); Chaowen Li, Hangzhou (CN); Xiongwei Lou, Hangzhou (CN); Yakui Shao, Hangzhou (CN); Yuanjing Sun, Hangzhou (CN)

(73) Assignees: ZHEJIANG A&F UNIVERSITY, Hangzhou (CN); LONGQUAN RESEARCH INSTITUTE OF FORESTRY, Longquan (CN); YUHUAN CITY NATURAL RESOURCES AND PLANNING BUREAU, Yuhuan (CN); HANGZHOU PERCEPTION TECHNOLOGY COMPANY LIMITED, Hangzhou (CN)

( * ) Notice: Subject to any disclaimer, the term of this patent is extended or adjusted under 35 U.S.C. 154(b) by 274 days.

(21) Appl. No.: 18/787,466

(22) Filed: Jul. 29, 2024

(65) Prior Publication Data

US 2025/0334389 A1 Oct. 30, 2025

(30) Foreign Application Priority Data

Apr. 24, 2024 (CN) ........................ 202410497949.0

(51) Int. Cl.
*G01B 5/00* (2006.01)
*G01B 7/12* (2006.01)
(Continued)

(52) U.S. Cl.
CPC ............ *G01B 5/0035* (2013.01); *G01B 7/12* (2013.01); *G01D 5/16* (2013.01); *G01F 1/56* (2013.01); *G01D 2205/26* (2021.05)

(58) Field of Classification Search
CPC .......... G01B 5/0035; G01B 7/12; G01D 5/16; G01D 2205/26; G01D 21/02; G01F 1/56
See application file for complete search history.

(56) References Cited

U.S. PATENT DOCUMENTS 826,759 A * 7/1906 Branch .................... G01B 3/56 33/464
2,924,019 A * 2/1960 Verner .................... A01G 7/00 33/783
4,549,355 A * 10/1985 Sauer ...................... G01B 7/16 33/794
(Continued)

FOREIGN PATENT DOCUMENTS

CN 114923411 A 8/2022
CN 116704333 A 9/2023

*Primary Examiner* — Kristina M Deherrera
*Assistant Examiner* — Tania Courson
(74) *Attorney, Agent, or Firm* — INNOVATION CAPITAL LAW GROUP, LLP; Vic Lin

(57) ABSTRACT

Disclosed is a measuring device for a single grass tree. In the present disclosure, the first measuring rod, the second measuring rod group and the third measuring rod which are connected in sequence can be arranged in the circumferential direction of a trunk of a single grass tree in a surrounding mode to form a measuring structure that can automatically extend and retract as the increase of the circumference of the (Continued)

trunk; the main control modules acquire an included angle between the two connected measuring rods corresponding to the magnetic rotary encoders based on the output of magnetic rotary encoders on the corresponding measuring rod. According to the present disclosure, the measurement of the radial growth of trees in multiple directions and the measurement of the tree sap flow rates of different radial depths in multiple directions are completed.

15 Claims, 4 Drawing Sheets

(51) Int. Cl.
*G01D 5/16* (2006.01)
*G01F 1/56* (2006.01)

(56) References Cited

U.S. PATENT DOCUMENTS

| | | | | | |
|---|---|---|---|---|---|
| 5,269,183 | A * | 12/1993 | Van Bavel | G01F 1/68 | 73/204.22 |
| 5,337,604 | A * | 8/1994 | Van Bavel | G01N 33/0098 | 73/204.22 |
| 6,009,631 | A * | 1/2000 | Gensler | G01B 5/0035 | 33/555.4 |
| 7,398,602 | B2 * | 7/2008 | Cohen Amar | G01B 5/0035 | 33/555.1 |
| 7,877,889 | B2 * | 2/2011 | Griffin, Jr. | E04G 21/185 | 33/562 |
| 8,590,373 | B1 * | 11/2013 | Van Bavel | G01F 1/6888 | 73/204.23 |
| 9,377,288 | B2 * | 6/2016 | DeLucia | G01N 33/0098 | |
| 12,092,452 | B2 * | 9/2024 | Clonch | G01B 5/025 | |
| 2026/0133022 | A1 * | 5/2026 | Selker | G01B 5/0035 | |

* cited by examiner

MEASURING DEVICE FOR SINGLE GRASS TREE

BACKGROUND OF THE INVENTION

1. Technical Field

The present disclosure relates to the technical field of measurement of a single grass tree, and particularly to a measuring device for a single grass tree.

2. Description of Related Art

At present, monitoring instruments for tree radial growth are classified into two types: point type and belt type. Point type monitors are mainly used to measure the radial growth of trees at specific points or specific directions, and are particularly suitable for capturing process events; belt type monitors are used to measure the changes in the circumference of the tree trunk to reflect the average radial growth. Examples of belt type monitors include DRL26D and DC3 tree stem dendrometer, which are suitable for standing trees with a DBH (diameter at breast height) of greater than 5 cm. By measuring the change in the pressure of the trunk on the probe, the diameter change is calculated indirectly. Point type monitors, such as DD-S and DD-L, are suitable for trees with different diameter ranges, which use a high-precision tension device to convert radial tension changes into resistance signals for monitoring. Presently, there are the following major problems for tree radial growth monitoring instruments when measuring the tree radial growth:

Firstly, the preload problem; existing monitors adopt the contact measurement, and mechanical structures such as built-in springs or springs generate preloads, which will affect the normal growth of trees, resulting in smaller measured values and affecting the model accuracy;

Secondly, the directional difference problem; because of the influence of various environmental and biological factors, the radial growth of trees may have significant difference in different directions. The point type monitors only measures a single direction, and the belt type monitors only provide an overall average value; while the trunk cross section is actually a “super ellipse”, which leads to difference in the DBH in different directions. The existing monitoring approaches are difficult to accurately capture this difference, affecting the accuracy of subsequent modeling.

In addition, in terms of tree sap flow monitoring, there are currently a number of methods available to measure the tree sap flow, such as radioisotope method, dye method, tracer method, lysimeter method, whole tree container method, rapid weighing method, heat pulse method and thermal dissipation method. Among them, the thermal dissipation method is widely used in the study of single tree transpiration and water consumption due to its simplicity, low destructiveness and continuous monitoring. However, in many studies, the changes in sap flow rate at radial depth and different orientations are no considered, and only the sap flow rate of the outermost layer of sapwood in the same orientation is used to represent the overall condition, resulting in errors in transpiration estimation. The sap flow rates of different tree species at different radial depths and orientations vary significantly, and are affected by the heterogeneity of internal hydraulic structure, crown shape, root distribution and external factors. The existing measurement methods are difficult to capture these temporal and spatial differences in a comprehensive and accurate manner.

Therefore, there is an urgent need to develop a preload-free monitoring device for tree radial growth that can monitor the sap flow rates at different radial depths and orientations and can simultaneously measure the radial growth of trees in multiple orientations.

BRIEF SUMMARY OF THE INVENTION

In order to solve the existing problem of transpiration estimation errors as a result of not considering the changes in sap flow rates in radial depth and different directions in many researches and the problem of preload and directivity difference of existing tree radial growth monitoring instruments, the present disclosure provides a measuring device for a single grass tree to measure tree radial changes in multiple directions and tree sap flow rates at different radial depths in multiple directions. The device includes:

a first measuring rod, a second measuring rod group and a third measuring rod; the first measuring rod is connected to one end of the second measuring rod group, the third measuring rod is connected to the other end of the second measuring rod group, and the second measuring rod group includes a plurality of second measuring rods which are sequentially connected;

a plurality of probe sampling modules, and a plurality of main control modules which are in communication connection with one another; the first measuring rod, the second measuring rods and the third measuring rod are in one-to-one correspondence with the plurality of main control modules and the plurality of probe sampling modules;

magnetic rotary encoders are arranged at one end of the first measuring rod and one end of each second measuring rod;

each of the first measuring rod, the second measuring rod and the third measuring rod includes a first telescopic rod and a second telescopic rod which are connected with one another; capacitive grating sensors are arranged on the first telescopic rod and the second telescopic rod; the probe sampling modules are arranged at connecting ends of the first telescopic rod and the second telescopic rod;

the capacitive grating sensors are used to measure the lengths of the corresponding telescopic rods; and the probe sampling modules are used to acquire instantaneous voltage differences at different radial depths;

the first measuring rod, the second measuring rod group and the third measuring rod which are connected in sequence can be arranged in the circumferential direction of a trunk of a single grass tree in a surrounding mode to form a measuring structure that can automatically extend and retract as the increase of the circumference of the trunk; the measuring structure is fixed to the trunk of the single grass tree by means of the probe sampling modules; the end, away from the second measuring rod group, of the first measuring rod and the end, away from the second measuring rod group, of the third measuring rod are both free ends;

the main control modules acquire an included angle between the two connected measuring rods corresponding to the magnetic rotary encoders based on the output of magnetic rotary encoders on the corresponding measuring rod; the main control modules are further used to acquire the radius of the arbor tree at a set point position according to the lengths of two telescopic rods in the corresponding measuring rod and the included angle of the two ends of the measuring rods, and the set point position is a contact position of the connecting ends of the two telescopic rods in the corresponding measuring rod and the trunk;

the main control modules are further used to acquire the tree sap flow rate corresponding to different radial depths according to instantaneous voltage differences generated by the probe sampling modules at different radial depths.

Further, the end, provided with the magnetic rotary encoder, of the first measuring rod is connected with the end, not provided with the magnetic rotary encoder, of the second measuring rod; in the two adjacent second measuring rods, the end, provided with the magnetic rotary encoder, of one second measuring rod is connected with the end, away from the magnetic rotary encoder, of the other second measuring rod.

Further, the probe sampling module includes a three-section type thermal dissipation probe, an ADC module and a STC processor; the three-section type thermal dissipation probe includes:

a first probe and a second probe which are arranged in parallel; each of the first probe and the second probe includes a thermocouple group; the first probe further includes a heating resistor; the thermocouple group includes a plurality of thermocouples arranged at equal intervals; one end of the thermocouple is grounded, and the other end of the thermocouple is connected into the ADC module;

the ADC module is used to measure the instantaneous voltage of each thermocouple and transmit the instantaneous voltage to the STC processors; and the STC processor computes the instantaneous voltage difference corresponding to the thermocouple pair based on the instantaneous voltages of the thermocouples of the first probe and the second probe at the same radial depth, and transmits the instantaneous voltage difference to the main control modules.

Further, the main control modules are also used to acquire the radius of the arbor tree at the set point position according to the lengths of two telescopic rods in the corresponding measuring rod and the included angle of the two ends of the measuring rod, and the acquisition formula is:

$$R = \frac{x1 + x2 - \frac{W}{2\tan(a)} - \frac{W}{2\tan(b)}}{\cot\left(\frac{a}{2}\right) + \cot\left(\frac{b}{2}\right)};$$

in the formula, x1 and x2 represent the length of the first telescopic rod and the second telescopic rod, respectively; w represents the vertical distance from the contact position of the corresponding three-section type thermal dissipation probe and the tree trunk to the central axis of the measuring rod; a represents the included angle of one end of the measuring rod; b represents the included angle of the other end of the measuring rod; and R represents the grass tree radius corresponding to the contact position of the three-section type thermal dissipation probe and the tree trunk.

Further, the main control modules are further used to acquire the tree sap flow rate corresponding to different radial depths according to instantaneous voltage differences generated by the probe sampling modules at different radial depths, and the acquisition formula is:

$$V = 0.0119 \times \left(\frac{dU\max - dU}{dU}\right)^{1.231} \times 3600;$$

in the formula, dU represents instantaneous voltage difference corresponding to the radial depth that is to be solved currently; $dU_{max}$ is the maximum instantaneous voltage difference in the instantaneous voltage differences generated at all the radial depths; and V represents the tree sap flow rates corresponding to the radial depth that is to be solved currently.

Further, the main control modules are arranged at the connecting end of the two telescopic rods in the corresponding measuring rod; and the probe sampling modules are arranged on the main control modules.

Further, the magnetic rotary encoder includes a rotating shaft, a base, a permanent magnet and an encoder chip; the rotating shaft is rotationally mounted in the base by means of a bearing assembly; the permanent magnet is fixedly connected to the rotating shaft; and the encoder chip is fixed to the base.

Further, the encoder chip includes a micro-processing module, a first Wheatstone bridge and a second Wheatstone bridge; any Wheatstone bridge includes a first TMR element, a second TMR element, a third TMR element and a fourth TMR element; one end of the first TMR element is connected to one end of the second TMR element and then connected into a power supply voltage Vcc; the other end of the second TMR element is connected to one end of the fourth TMR element and then connected into a second node; the other end of the fourth TMR element is connected to one end of the third TMR element and then grounded; and the other end of the third TMR element and the other end of the first TMR element are connected into a first node.

Further, the first Wheatstone bridge is used to generate a first voltage signal and a second voltage signal when the rotating shaft rotates by 0-360 degrees, and input into the micro-processing modules through the corresponding first node and second node;

the second Wheatstone bridge is used to generate a third voltage signal and a fourth voltage signal when the rotating shaft rotates by 0-360 degrees, and input the signals into the micro-processing modules through the corresponding first node and second node;

a first voltage curve and a second voltage curve are two paths of orthogonal sine waves; the first voltage curve is a voltage curve formed by differential voltage of the first voltage signal and the second voltage signal; and the second voltage curve is a voltage curve formed by differential voltage of the third voltage signal and the fourth voltage signal.

Further, the micro-processing module includes a filter, an analog-to-digital converter and a microprocessor;

the filter is used to receive the first voltage signal, the second voltage signal, the third voltage signal and the fourth voltage signal, filter the signals and input the signals into the analog-to-digital converter;

the analog-to-digital converter is used to convert the continuously changing first voltage signal, second voltage signal, third voltage signal and fourth voltage signal into discrete digital signals respectively, and input the signals into the microprocessor;

the microprocessor is used to generate two paths of orthogonal A digital pulse signals and B digital pulse signals through the discrete digital signals corresponding to the first voltage signal and the second voltage signal and the discrete digital signals corresponding to the third voltage signal and the fourth voltage signal, and Z pulse signals, and input the signals into the main control modules; and the Z pulse signals are generated once when the rotating shaft rotates by one circle and passes through a specific reference point.

Further, the differential voltage of the first voltage signal and the second voltage signal is calculated according to the following formula:

$$UA = U_{A+} - U_{A-} = Vcc\left(\frac{R3}{R1+R3} - \frac{R4}{R2+R4}\right);$$

In the formula, $U_{A+}$ represents the first voltage signal outputted by the first node A+ in the first Wheatstone bridge; $U_{A-}$ represents the second voltage signal outputted by the second node A− in the first Wheatstone bridge; Vcc represents the power supply voltage of the first Wheatstone bridge; $R_1$ and $R_3$ represent the resistances of the first TMR element and the third TMR element in the first Wheatstone bridge, respectively; $R_2$ and $R_4$ represent the resistances of the second TMR element and the fourth TMR element in the first Wheatstone bridge, respectively; and $U_A$ represents the differential voltage of the first voltage signal and the second voltage signal.

Further, the differential voltage of the third voltage signal and the fourth voltage signal is calculated according to the following formula:

$$UB = U_{B+} - U_{B-} = Vcc\left(\frac{R7}{R5+R7} - \frac{R8}{R6+R8}\right);$$

In the formula, $U_{B+}$ represents the third voltage signal outputted by the first node B+ in the second Wheatstone bridge; $U_{B-}$ represents the fourth voltage signal outputted by the second node B− in the second Wheatstone bridge; Vcc represents the power supply voltage of the second Wheatstone bridge; $R_5$ and $R_7$ represent the resistances of the first TMR element and the third TMR element in the second Wheatstone bridge, respectively; $R_6$ and $R_8$ represent the resistances of the second TMR element and the fourth TMR element in the second Wheatstone bridge, respectively; and $U_B$ represents the differential voltage of the third voltage signal and the fourth voltage signal.

Further, the main control module further includes a first counter T0 and a second counter T1.

Further, the main control modules acquire the included angle between two connected measuring rods corresponding to the magnetic rotary encoders based on the output of magnetic rotary encoders on the corresponding measuring rod, specifically including:

the main control modules detect rising edges or falling edges of the A digital pulse signals and the B digital pulse signals;

the first counter T0 counts in an increasing manner when the main control modules detect that the A digital pulse signals lead the B digital pulse signals and detect the rising edge of one A digital pulse signal, and counts in a decreasing manner when the main control modules detect that the B digital pulse signals lead the A digital pulse signals and detect one B digital pulse signal;

the second counter T1 counts in an increasing manner when the Z pulse signals generate one pulse; and the main control modules compute the included angle between the two connected measuring rods corresponding to the magnetic rotary encoders through a counting value corresponding to the A digital pulse signals, a counting value corresponding to the B digital pulse signals and a counting value of the second counter.

Further, a formula for computing the included angle between two connected measuring rods corresponding to the magnetic rotary encoders is:

$$A_{included\ angle} = (\text{couting difference}_{T0} \times \text{minimum angle unit}) + (\text{counting value}_{T1} \times 360°);$$

in the formula, the counting difference$_{T0}$ is a difference value between the counting value corresponding to the A digital pulse signals and the counting value corresponding to the B digital pulse signals; the minimum angle unit is an angle represented by each counting increment of the magnetic rotary encoders; the counting value$_{T1}$ represents the counting value of the second counter; 360° represents the degree of one circle; and the $A_{included\ angle}$ represents an angle of the magnetic rotary encoders rotating from an initial position to a current position.

Compared with the prior art, the present disclosure has at least the following beneficial effects:

(1) in the present disclosure, the first measuring rod, the second measuring rod group and the third measuring rod which are connected in sequence can be arranged in the circumferential direction of the trunk of the single grass tree in the surrounding manner to form the measuring structure that can automatically extend and retract as the increase of the circumference of the trunk; the main control modules acquire an included angle between the two connected measuring rods corresponding to the magnetic rotary encoders based on the output of the magnetic rotary encoder on the corresponding measuring rod; the main control modules are further used to acquire the radius of the arbor tree at a set point position according to the lengths of two telescopic rods in the corresponding measuring rod and the included angle of the two ends of the measuring rods; the main control modules are further used to acquire the tree sap flow rate corresponding to different radial depths according to instantaneous voltage differences generated by the probe sampling modules at different radial depths; that is, in the present disclosure, the measuring device simultaneously completes the measurement of the radial growth of trees in multiple directions and the measurement of the tree sap flow rates of different radial depths in multiple directions through the plurality of probe sampling modules, the plurality of main control modules which are in communication connection with one another, and the magnetic rotary encoders arranged at one end of the first measuring rod and one end of the second measuring rod, thereby realizing the all-around, multi-scale and preload-free synchronous monitoring of the radial growth and sap flow of the trees.

(2) in the present disclosure, the magnetic rotary encoders and the capacitive grating sensors are used to measure the radial growth change of the tree, the magnetic rotary encoders are used to monitor the included angle between two corresponding connected measuring rods, and the capacitive grating sensors are used to measure the length of the corresponding telescopic rods, so that the radial growth monitoring of the tree without pre-tightening force is realized, the precision and reliability of radial growth and sap flow rate measurement are improved, and error sources are reduced;

(3) in the present disclosure, the first telescopic rod and the second telescopic rod can extend out and draw back left and right to adapt to the mounting requirements and growth requirements of trees with different sizes, and the universality, flexibility and accuracy of monitoring are ensured; and (4) in the present disclosure, an integrated novel monitoring device is formed by integrating the first measuring rod, the second measuring rod group, the third measuring rod, the plurality of probe sampling modules, the plurality of main control modules which are in communication connection with one another, the magnetic rotary encoders arranged at one end of the first measuring rod and one end of the second measuring rod, and the capacitive grating sensors arranged on the first telescopic rod and the second telescopic rod. The integrated novel monitoring device has the characteristics of compact structure, function integration and high adaptability, and meanwhile, achieves comprehensive, multi-scale and non-pre-tightening synchronous monitoring of the radial growth and sap flow of trees.

REFERENCE NUMERALS

1, first measuring rod; 2, second measuring rod; 3, third measuring rod; 4, main control module; 5, magnetic rotary encoder; 6, first telescopic rod; 7, second telescopic rod; 8, flange; 9, three-section type thermal dissipation probe; 91, first probe; 92, second probe; 10, signal processing module; 11, plug-in circuit of first probe; 12, plug-in circuit of second probe; 13, ADC processor circuit; 14, STC processor circuit.

DETAILED DESCRIPTION OF THE INVENTION

The technical solutions of the present disclosure will be further described below in conjunction with the specific embodiments and accompanying drawings, but the present disclosure is not limited to these embodiments.

EXAMPLE 1

Figure 1:
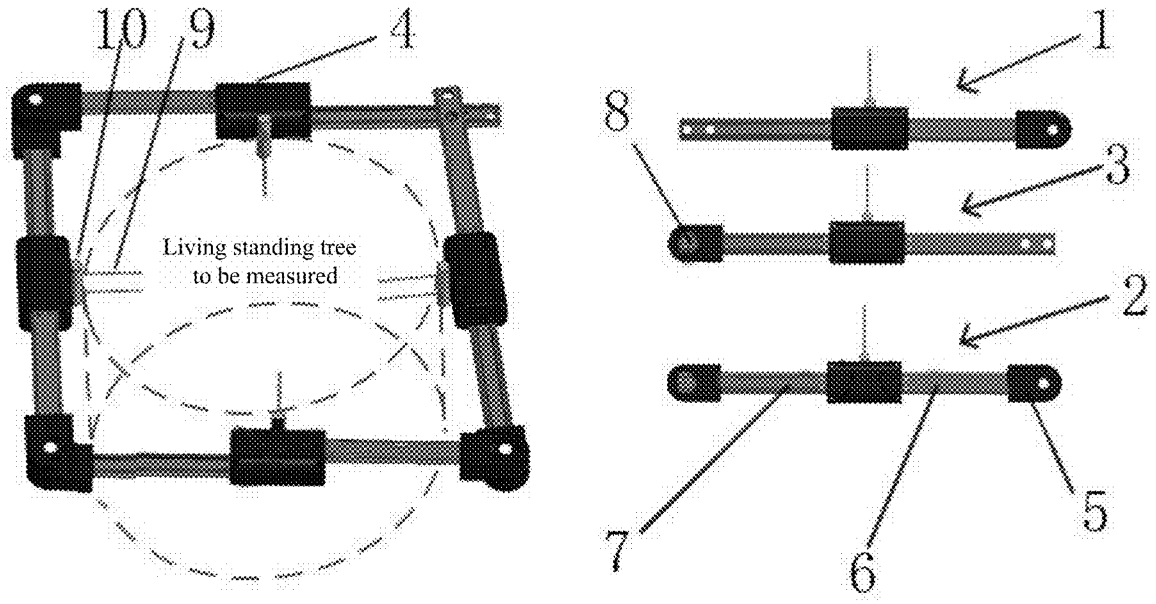
FIG. 1 is a structural diagram of a measuring device for a single grass tree.

In order to simultaneously complete the measurement of the radial growth of trees in multiple directions and the measurement of the tree sap flow rates of different radial depths in multiple directions, and realize the all-around, multi-scale and preload-free synchronous monitoring of the radial growth and sap flow of the trees, as shown in FIG. 1, the present disclosure provides a measuring device for a single grass tree to measure tree radial changes in multiple directions and tree sap flow rates at different radial depths in multiple directions; the device includes:

a first measuring rod 1, a second measuring rod group and a third measuring rod 3; the first measuring rod 1 is connected to one end of the second measuring rod group, the third measuring rod 3 is connected to the other end of the second measuring rod group, and the second measuring rod group includes a plurality of second measuring rods 2 which are sequentially connected;

a plurality of probe sampling modules, and a plurality of main control modules 4 which are in communication connection with one another; the first measuring rod 1, the second measuring rods 2 and the third measuring rod 3 are in one-to-one correspondence with the plurality of main control modules 4 and the plurality of probe sampling modules;

magnetic rotary encoders 5 are arranged at one end of the first measuring rod 1 and one end of each second measuring rod 2;

the end, provided with the magnetic rotary encoder 5, of the first measuring rod 1 is connected with the end, not provided with the magnetic rotary encoder 5, of the second measuring rod 2; in the two adjacent second measuring rods 2, the end, provided with the magnetic rotary encoder, of one second measuring rod 2 is connected with the end, away from the magnetic rotary encoder 5, of the other second measuring rod 2.

each of the first measuring rod 1, the second measuring rod 2 and the third measuring rod 3 includes a first telescopic rod 6 and a second telescopic rod 7 which are connected with one another; capacitive grating sensors are arranged on the first telescopic rod 6 and the second telescopic rod 7; the probe sampling modules are arranged at connecting ends of the first telescopic rod 6 and the second telescopic rod 7;

Specifically, the main control modules 4 are arranged at the connecting end of the two telescopic rods in the corresponding measuring rod; and the probe sampling modules are arranged on the main control modules 4.

It should be noted that one end of the third measuring rod 3 and the other end of the second measuring rod 2 are also provided with a flange 8; the flange 8 is used to connect two adjacent measuring rods; the end, provided with the flange, of the third measuring rod 3 is connected to the end, provided with a magnetic rotary encoder 5, of the second measuring rod 2. A measuring device includes at least one first measuring rod 1, two second measuring rods 2 and one third measuring rod 3.

Figure 2:
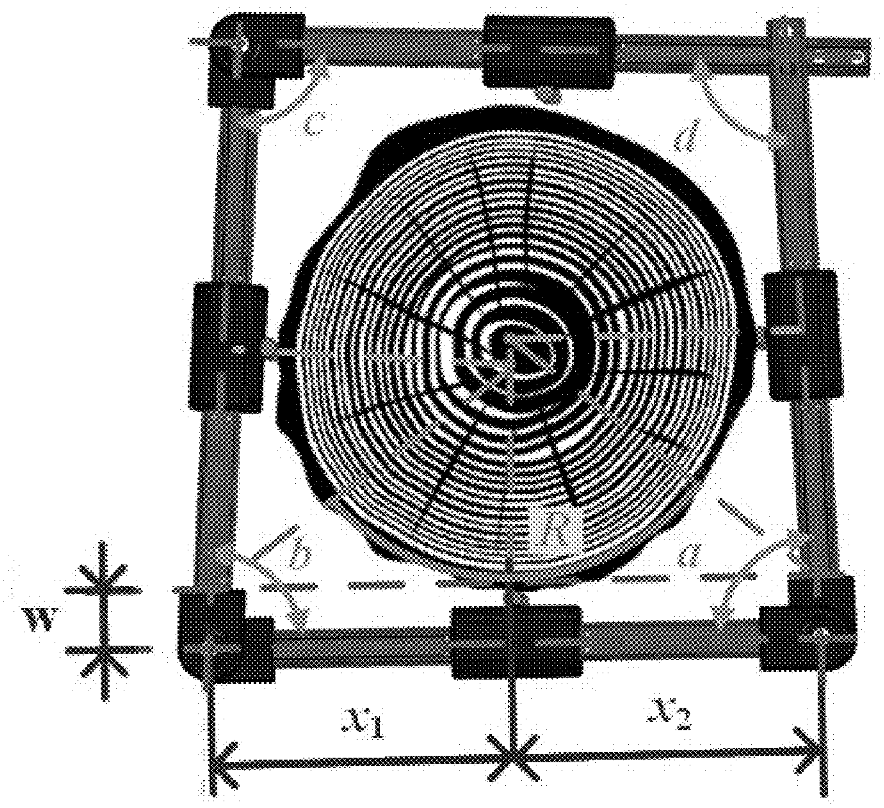
FIG. 2 is a measured diagram of a measuring device for a single grass tree.
Figure 4:
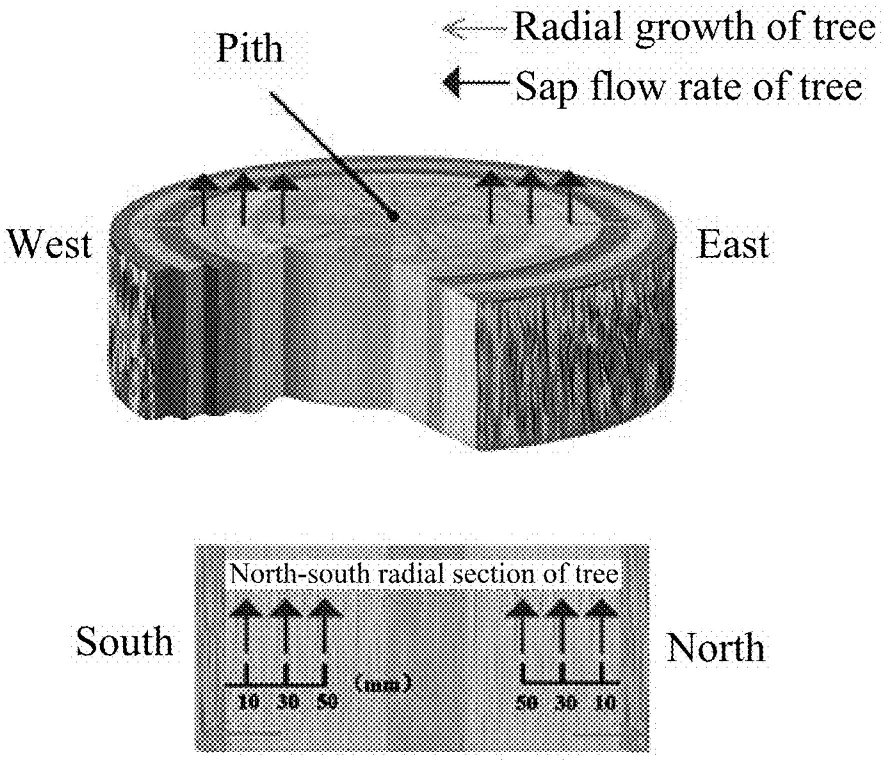
FIG. 4 is a schematic diagram of measuring different radial depths on a tree cross section.

As shown in FIG. 2 and FIG. 4, this embodiment realizes the monitoring of the radial growth (arbor radius) of trees at a total of 4 points in the east, south, west and north directions (i.e., the set points, specifically the contact positions between the connection ends of the two telescopic rods in the measuring rod and the trunk) and the monitoring of the sap flow rate of trees at a total of 12 points in the east, south, west and north directions (10 mm, 30 mm and 50 mm away from the pith, respectively).

Figure 3:
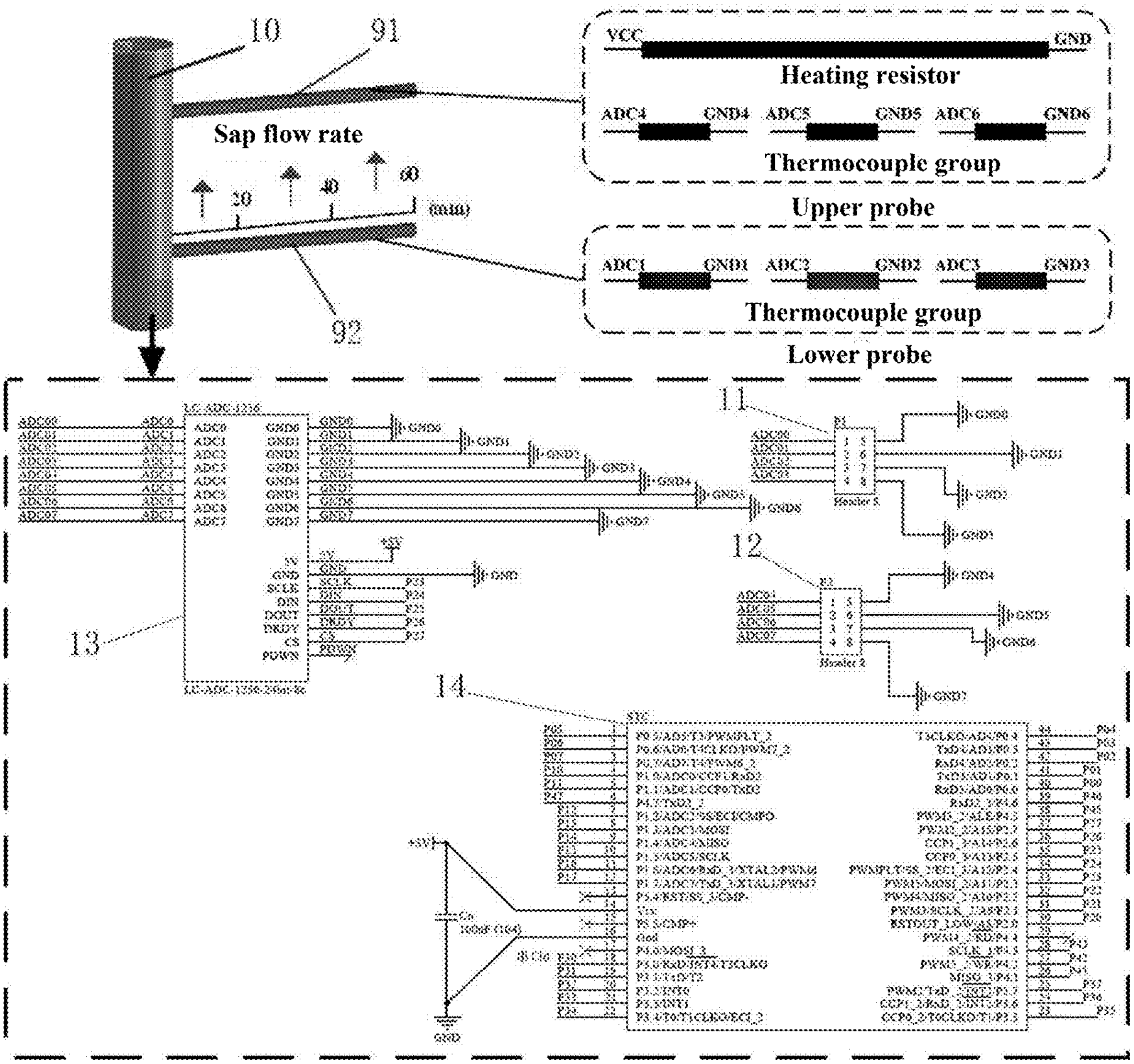
FIG. 3 is a circuit diagram of a probe sampling module.

The probe sampling module includes a three-section type thermal dissipation probe 9 and a signal processing module 10; wherein, the signal processing module 10 includes an ADC module and a STC processor; the three-section type thermal dissipation probe 9 includes:

a first probe 91 and a second probe 92 which are arranged in parallel; as shown in FIG. 3, each of the first probe 91 (i.e., the upper probe) and the second probe 92 (i.e., the lower probe) includes a thermocouple group; the first probe 91 further includes a heating resistor; the thermocouple group includes a plurality of thermocouples arranged at equal intervals; one end of the thermocouple is grounded, and the other end of the thermocouple is connected into the ADC module;

the ADC module is used to measure the instantaneous voltage of each thermocouple and transmit the instantaneous voltage to the STC processors; and the STC processor computes the difference between the instantaneous voltages of the thermocouples of the first probe and the second probe at the same radial depth as the instantaneous voltage difference corresponding to the radial depth, and transmits the instantaneous voltage difference to the main control modules.

Wherein, the ADC module includes a plug-in circuit 11 of first probe, a plug-in circuit 12 of second probe and an ADC processor circuit 13. The first probe is connected to the ADC processor circuit 13 through the plug-in circuit 11; the second probe is connected to the ADC processor circuit 13 through the plug-in circuit 12.

Specifically, the circuit corresponding to the signal processing module 10 is shown in FIG. 3, which specifically includes a plug-in circuit 11 of first probe, a plug-in circuit 12 of second probe, an ADC processor circuit 13 and a circuit 14 corresponding to the STC processor.

In this embodiment, as shown in FIG. 3, the upper probe includes a heating resistor and three thermocouples, and the lower probe includes three thermocouples, wherein the interval between the three thermocouples of each of the upper and lower probes is 20 mm, and the three thermocouples are distributed in the 0-20 mm, 20-40 mm, and 40-60 mm sections. The instantaneous voltage of the thermocouples is measured by the connected ADC module, so as to monitor the tree sap flow rate at 10, 30, and 50 mm.

The capacitive grating sensors are used to measure the lengths of the corresponding telescopic rods; and the probe sampling modules are used to acquire instantaneous voltage differences at different radial depths;

the first measuring rod 1, the second measuring rod group and the third measuring rod 3 which are connected in sequence can be arranged in the circumferential direction of a trunk of a single grass tree in a surrounding mode to form a measuring structure that can automatically extend and retract as the increase of the circumference of the trunk; the measuring structure is fixed to the trunk of the single grass tree by means of the probe sampling modules; the end, away from the second measuring rod group, of the first measuring rod 1 and the end, away from the second measuring rod group, of the third measuring rod 3 are both free ends;

When installing the measuring device, various measuring rods are connected by flanges and arranged in the circumferential direction of a trunk of a single grass tree in a surrounding mode; meanwhile, a three-section type thermal dissipation probe 9 is inserted into the trunk with the bark removed and fixed with glue. Since the first telescopic rod 6 and the second telescopic rod 7 can be extended and retracted left and right to adapt to trees with different sizes, and the end, away from the second measuring rod group, of the first measuring rod 1 and the end, away from the second measuring rod group, of the third measuring rod 3, are both free ends, when the trunk diameter changes, the included angle between adjacent measuring rods will also change accordingly. Combined with the measurement of the included angle with a magnetic rotary encoder and the measurement of the telescopic length of the telescopic rod with a capacitive sensor, the "preload-free" monitoring of the tree radial change can be realized; meanwhile, a single three-section type thermal dissipation probe 9 can fulfill the measurement of three radial depths of 10, 30, and 50 mm from the tree cambium, and finally achieves the measurement of the radial growth of trees in multiple directions and the measurement of the sap flow rate of trees at different radial depths in multiple directions.

The main control modules 4 acquire an included angle between the two connected measuring rods corresponding to the magnetic rotary encoders 5 based on the output of magnetic rotary encoders 5 on the corresponding measuring rod; the main control modules 4 are further used to acquire the radius of the arbor tree at a set point position according to the lengths of two telescopic rods in the corresponding measuring rod and the included angle of the two ends of the measuring rods, and the set point position is a contact position of the connecting ends of the two telescopic rods in the corresponding measuring rod and the trunk;

the magnetic rotary encoder includes a rotating shaft, a base, a permanent magnet and an encoder chip; the rotating shaft is rotationally mounted in the base by means of a bearing assembly; the permanent magnet is fixedly connected to the rotating shaft; and the encoder chip is fixed to the base.

Figure 5:
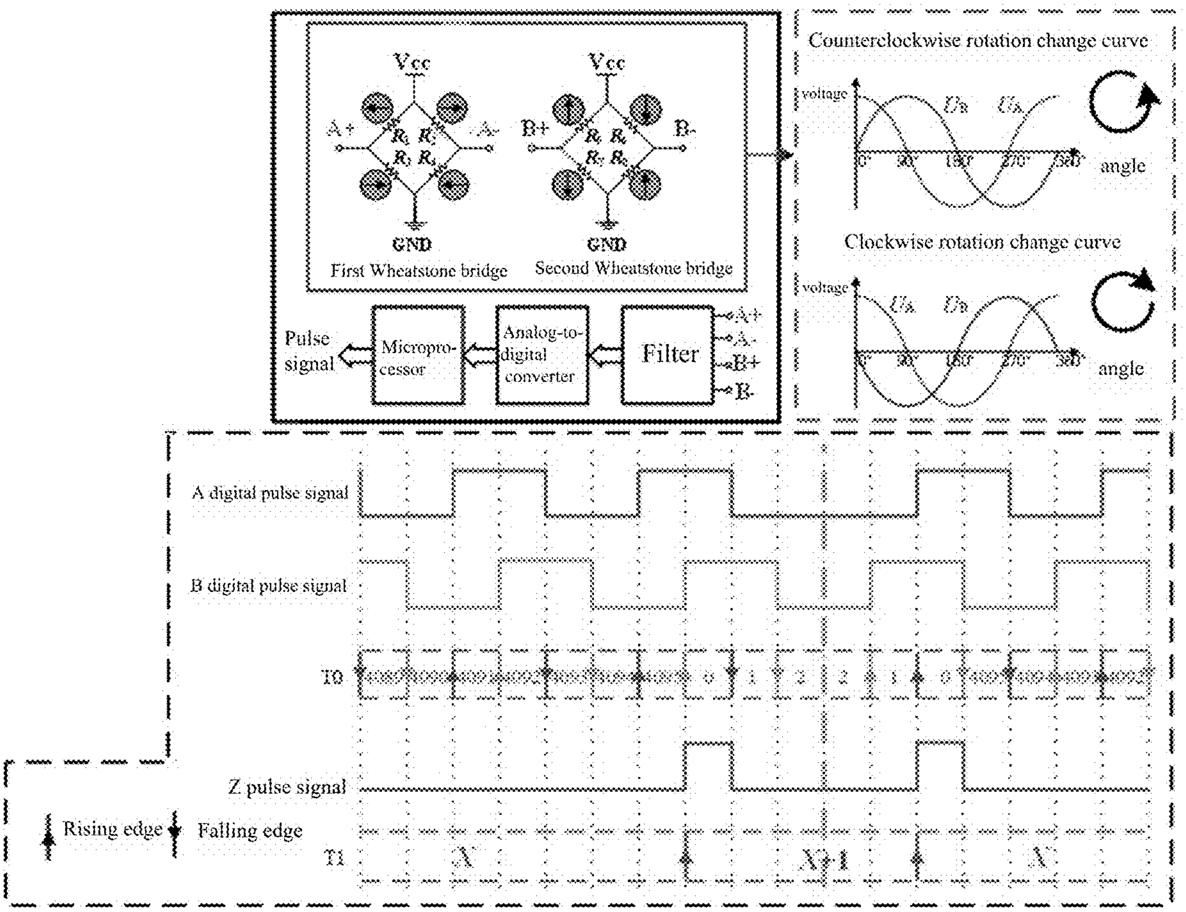
FIG. 5 is an internal schematic diagram of a magnetic rotary encoder.

Specifically, the connection relationship between the rotating shaft, the permanent magnet (i.e., encoder disc), the base, and the encoder chip is as follows:

The rotating shaft is tightly and fixedly connected with the encoder disc. The encoder disc is directly fixed on the rotating shaft to ensure that they rotate synchronously without relative sliding;

The rotating shaft is connected with the base by bearings to achieve rotation; the rotating shaft is supported by bearings and mounted in the base, and the bearings allow the rotating shaft to rotate freely in the base while maintaining stability and reducing friction;

The encoder disc has no direct physical connection with the base. The encoder disc is indirectly associated with the base through the rotating shaft, but due to the existence of the bearing, the encoder disc can rotate freely relative to the base;

The encoder chip is fixedly connected with the base; the encoder chip is mounted on the base or a fixed circuit board, which is close to the encoder disc but does not rotate with the rotating shaft, ensuring stable detection of signal changes on the encoder disc;

The encoder chip is in non-physical connection with the rotating shaft/encoder disc, with functional interactions. The encoder chip monitors the rotary position of the rotating shaft and the encoder disc by sensing the change in magnetic field generated by the rotation of the encoder disc (for example, in a magnetic rotary encoder), but there is no physically direct rotational relationship between them;

As shown in FIG. 5, the encoder chip includes a microprocessing module, a first Wheatstone bridge and a second Wheatstone bridge; any Wheatstone bridge includes a first TMR element, a second TMR element, a third TMR element and a fourth TMR element; one end of the first TMR element is connected to one end of the second TMR element and then connected into a power supply voltage Vcc; the other end of the second TMR element is connected to one end of the fourth TMR element and then connected into a second node; the other end of the fourth TMR element is connected to one end of the third TMR element and then grounded; and the other end of the third TMR element and the other end of the first TMR element are connected into a first node.

The first Wheatstone bridge is used to generate a first voltage signal A+ and a second voltage signal A− when the rotating shaft rotates by 0-360 degrees, and input into the micro-processing modules through the corresponding first node and second node;

the second Wheatstone bridge is used to generate a third voltage signal B+ and a fourth voltage signal B− when the rotating shaft rotates by 0-360 degrees, and input the signals into the micro-processing modules through the corresponding first node and second node;

a first voltage curve formed by a differential voltage of the first voltage signal and the second voltage signal (see $U_A$ curve in the counterclockwise rotation change curve and the clockwise rotation change curve in FIG. 5) and a second voltage curve formed by a differential voltage of the third voltage signal and the fourth voltage signal (see $U_B$ curve in the counterclockwise rotation change curve and the clockwise rotation change curve in FIG. 5) are two paths of orthogonal sine waves. The phase difference between the first voltage curve and the second voltage curve is 90 degrees or 180 degrees, depending on the rotation direction of the rotating shaft (clockwise or counterclockwise);

The differential voltage of the first voltage signal and the second voltage signal is calculated according to the following formula:

$$UA = U_{A+} - U_{A-} = Vcc\left(\frac{R3}{R1 + R3} - \frac{R4}{R2 + R4}\right);$$

In the formula, $U_{A+}$ represents the first voltage signal outputted by the first node A+ in the first Wheatstone bridge; $U_{A-}$ represents the second voltage signal outputted by the second node A− in the first Wheatstone bridge; Vcc represents the power supply voltage of the first Wheatstone bridge; $R_1$ and $R_3$ represent the resistances of the first TMR element and the third TMR element in the first Wheatstone bridge, respectively; $R_2$ and $R_4$ represent the resistances of the second TMR element and the fourth TMR element in the first Wheatstone bridge, respectively; and $U_A$ represents the differential voltage of the first voltage signal and the second voltage signal.

the differential voltage of the third voltage signal and the fourth voltage signal is calculated according to the following formula:

$$UB = U_{B+} - U_{B-} = Vcc\left(\frac{R7}{R5 + R7} - \frac{R8}{R6 + R8}\right);$$

In the formula, $U_{B+}$ represents the third voltage signal outputted by the first node B+ in the second Wheatstone bridge; $U_{B-}$ represents the fourth voltage signal outputted by the second node B− in the second Wheatstone bridge; Vcc represents the power supply voltage of the second Wheatstone bridge; $R_5$ and $R_7$ represent the resistances of the first TMR element and the third TMR element in the second Wheatstone bridge, respectively; $R_6$ and $R_8$ represent the resistances of the second TMR element and the fourth TMR element in the second Wheatstone bridge, respectively; and $U_B$ represents the differential voltage of the third voltage signal and the fourth voltage signal.

The micro-processing module includes a filter, an analog-to-digital converter and a microprocessor;

the filter is used to receive the first voltage signal, the second voltage signal, the third voltage signal and the fourth voltage signal, filter the signals and input the signals into the analog-to-digital converter;

the analog-to-digital converter is used to convert the continuously changing first voltage signal, second voltage signal, third voltage signal and fourth voltage signal into discrete digital signals respectively, and input the signals into the microprocessor;

the microprocessor is used to generate two paths of orthogonal A digital pulse signals and B digital pulse signals through the discrete digital signals corresponding to the first voltage signal and the second voltage signal and the discrete digital signals corresponding to the third voltage signal and the fourth voltage signal, and Z pulse signals, and input the signals into the main control modules; and the Z pulse signals are generated once when the rotating shaft rotates by one circle and passes through a specific reference point.

Specifically, the Z pulse signals are generated once when the rotating shaft rotates by one circle and passes through a specific reference point (usually the zero position), and the signal width is usually half of the pulse output signal period of the A digital pulse signals or the B digital pulse signals.

The main control module further includes a first counter T0 and a second counter T1.

The main control modules acquire the included angle between two connected measuring rods corresponding to the magnetic rotary encoders based on the output of magnetic rotary encoders on the corresponding measuring rod, specifically including:

the main control modules detect rising edges or falling edges of the A digital pulse signals (hereinafter referred to as A) and the B digital pulse signals (hereinafter referred to as B); if the rotating shaft rotates clockwise, the A signal will reach the rising edge (or falling edge) half a pulse period earlier than the B signal; otherwise, the B signal will lead; by judging the relative sequence of A and B signals, the rotation direction can be determined;

the first counter T0 counts in an increasing manner when the main control modules detect that the A digital pulse signals lead the B digital pulse signals and detect the rising edge of one A digital pulse signal, and counts in a decreasing manner when the main control modules detect that the B digital pulse signals lead the A digital pulse signals and detect one B digital pulse signal;

the second counter T1 counts in an increasing manner when the Z pulse signals (hereinafter referred to as Z) generate one pulse; it should be noted that, in T0 of FIG. 5, X represents the counting value, and X+1 represents the counting increment; in FIG. 5, the value in T0 represents the counting value of the first counter T0.

The main control modules compute the included angle between the two connected measuring rods corresponding to the magnetic rotary encoders through a counting value corresponding to the A digital pulse signals, a counting value corresponding to the B digital pulse signals and a counting value of the second counter.

It should be explained that the relative phase changes of the A and B signals as orthogonal encoding signals reflect the small angular movement of the magnetic rotary encoder; generally, every four rising edges (or falling edges) of A or B correspond to a minimum resolution unit of a complete encoder (for example, a quarter period, if it is a four-phase encoding);

When the magnetic rotary encoder rotates, by comparing the sequence of the rising edges of the A and B signals (i.e., which signals reach the rising edges first), it can be decided to count forward (for example, A before B) or count backward (B before A); the T0 counter counts in an increasing manner or a decreasing manner according to this logic, and accumulates the number of these minimum resolution units, thereby indirectly reflecting the change in angle.

The counting difference refers to the difference between the A and B signal counts after a certain reference point; for example, if starting from a known starting point, A leads B by one pulse, then T0 may be displayed as +1 (assuming the forward counting is positive), which represents that the encoder has rotated a specific minimum angle unit relative to the starting point.

The Z signal is a signal that outputs one pulse per cycle, which is used to indicate that the encoder has rotated a full cycle. When the Z signal has a rising edge each time, the T1 counter increases the count by 1, thereby recording the total number of cycles.

A formula for computing the included angle between two connected measuring rods corresponding to the magnetic rotary encoders is:

$$A_{included\ angle} = (\text{counting difference}_{T0} \times \text{minimum angle unit}) + (\text{counting value}_{T1} \times 360°);$$

in the formula, the counting $\text{difference}_{T0}$ is a difference value between the counting value corresponding to the A digital pulse signals and the counting value corresponding to the B digital pulse signals; the minimum angle unit is an angle represented by each counting increment of the magnetic rotary encoders; counting $\text{value}_{T1}$ represents the counting value of the second counter; 360° represents the degree of one circle; and the $A_{included\ angle}$ represents an angle of the magnetic rotary encoders rotating from an initial position to a current position.

The magnetic rotary encoder provided in the present disclosure is capable of accurately tracking the position change of fast moving or rotating parts, so that a very accurate angle measurement can be provided with high resolution and small error, to be suitable for applications requiring precise control and measurement.

It should be noted that the main control modules 4 are also used to transmit the acquired angle information to other main control modules, so that each main control module can obtain the included angles at both ends of the corresponding measuring rods, thereby calculating the arbor radius at the corresponding set point.

As shown in FIG. 2, the included angles at both ends of the lower measuring rod are b and a; the included angles at both ends of the upper measuring rod are c and d; the included angles at both ends of the left measuring rod are c and b; and the included angles at both ends of the right measuring rod are d and a. Among them, the three angles (a, b and c) are measured by the magnetic rotary encoder, and the angle d is calculated by the formula (d=360°−a−b−c).

The main control modules are also used to acquire the radius of the arbor tree at the set point position according to the lengths of two telescopic rods in the corresponding measuring rod and the included angle of the two ends of the measuring rod, and the acquisition formula is:

$$R = \frac{x1 + x2 - \frac{W}{2\tan(a)} - \frac{W}{2\tan(b)}}{\cot\left(\frac{a}{2}\right) + \cot\left(\frac{b}{2}\right)};$$

in the formula, x1 and x2 represent the length of the first telescopic rod 6 and the second telescopic rod 7, respectively; w represents the vertical distance from the contact position of the corresponding three-section type thermal dissipation probe and the tree trunk to the central axis of the measuring rod; a represents the included angle of one end of the measuring rod; b represents the included angle of the other end of the measuring rod; and R represents the grass tree radius corresponding to the contact position of the three-section type thermal dissipation probe and the tree trunk.

The main control modules are further used to acquire the tree sap flow rate corresponding to different radial depths according to instantaneous voltage differences generated by the probe sampling modules at different radial depths.

The main control modules are further used to acquire the tree sap flow rate corresponding to different radial depths according to instantaneous voltage differences generated by the probe sampling modules at different radial depths, and the acquisition formula is:

$$V = 0.0119 \times \left(\frac{dU\max - dU}{dU}\right)^{1.231} \times 3600;$$

in the formula, dU represents instantaneous voltage difference corresponding to the radial depth that is to be solved currently; $dU_{max}$ is the maximum instantaneous voltage difference in the instantaneous voltage differences generated at all the radial depths; and V represents the tree sap flow rates corresponding to the radial depth that is to be solved currently; the unit of 3600 is g/h (grams per hour); 0.0119 is the constant coefficient; 1.231 is the numerical constant.

In the present disclosure, the first measuring rod, the second measuring rod group and the third measuring rod which are connected in sequence can be arranged in the circumferential direction of the trunk of the single grass tree in the surrounding manner to form the measuring structure that can automatically extend and retract as the increase of the circumference of the trunk; the main control modules acquire an included angle between the two connected measuring rods corresponding to the magnetic rotary encoders based on the output of the magnetic rotary encoder on the corresponding measuring rod; the main control modules are further used to acquire the radius of the arbor tree at a set point position according to the lengths of two telescopic rods in the corresponding measuring rod and the included angle of the two ends of the measuring rods; the main control modules are further used to acquire the tree sap flow rate corresponding to different radial depths according to instantaneous voltage differences generated by the probe sampling modules at different radial depths; that is, in the present disclosure, the measuring device simultaneously completes the measurement of the radial growth of trees in multiple directions and the measurement of the tree sap flow rates of different radial depths in multiple directions through the plurality of probe sampling modules, the plurality of main control modules which are in communication connection with one another, and the magnetic rotary encoders arranged at one end of the first measuring rod and one end of the second measuring rod, thereby realizing the all-around, multi-scale and preload-free synchronous monitoring of the radial growth and sap flow of the trees.

It should be noted that all directional indications (such as up, down, left, right, front, back, etc.) in the embodiments of the present disclosure are only used to explain the relative position relationship, movement, etc. between the components under a specific posture (as shown in the accompanying drawings). If the specific posture changes, the directional indication will also change accordingly.

Furthermore, in the present disclosure, the descriptions such as "first", "second", "one", etc. are only used for descriptive purposes, and should not be construed as indicating or implying their relative importance or implicitly indicating the number of technical features indicated. Therefore, the features defined as "first" and "second" may explicitly or implicitly include at least one of the features. In the description of the present disclosure, "multiple" and "a/the plurality of" mean at least two, for example, two, three, etc., unless otherwise clearly defined.

In the present disclosure, unless otherwise clearly specified and defined, the terms "connection/connected", "fix/fixed", etc. should be understood in a broad sense. For example, "fix/fixed" can be fixedly connected, detachably connected or integrated; can be mechanically connected or electrically connected; can be directly connected or indirectly connected through an intermediate medium, can be internally communicated or mutually interacted between two elements, unless otherwise clearly defined. For a person of ordinary skill in the art, the specific meanings of the above terms in the present disclosure can be understood according to specific circumstances.

Furthermore, the technical solutions between various embodiments of the present disclosure can be mutually combined provided that these solutions can be achieved by a person of ordinary skill in the art. When the combination of technical solutions is contradictory or cannot be implemented, it should be considered that such a combination of technical solutions does not exist and is not within the scope of protection of the present disclosure.

What is claimed is:

1. A measuring device for a single grass tree, wherein the device is used to measure tree radial changes in multiple directions and tree sap flow rates at different radial depths in multiple directions; comprising:

- a first measuring rod, a second measuring rod group and a third measuring rod; wherein, the first measuring rod is connected to one end of the second measuring rod group, the third measuring rod is connected to the other end of the second measuring rod group, and the second measuring rod group comprises a plurality of second measuring rods which are sequentially connected;
- a plurality of probe sampling modules, and a plurality of main control modules which are in communication connection with one another; the first measuring rod, the second measuring rods and the third measuring rod are in one-to-one correspondence with the plurality of main control modules and the plurality of probe sampling modules;
- magnetic rotary encoders are arranged at one end of the first measuring rod and one end of each second measuring rod;
- each of the first measuring rod, the second measuring rod and the third measuring rod comprises a first telescopic rod and a second telescopic rod which are connected with one another; capacitive grating sensors are arranged on the first telescopic rod and the second telescopic rod; the probe sampling modules are arranged at connecting ends of the first telescopic rod and the second telescopic rod;
- the capacitive grating sensors are used to measure the lengths of the corresponding telescopic rods; and the probe sampling modules are used to acquire instantaneous voltage differences at different radial depths;
- the first measuring rod, the second measuring rod group and the third measuring rod which are connected in sequence can be arranged in the circumferential direction of a trunk of a single grass tree in a surrounding mode to form a measuring structure that can automatically extend and retract as the increase of the circumference of the trunk; the measuring structure is fixed to the trunk of the single grass tree by means of the probe sampling modules; the end, away from the second measuring rod group, of the first measuring rod and the end, away from the second measuring rod group, of the third measuring rod are both free ends;
- the main control modules acquire an included angle between the two connected measuring rods corresponding to the magnetic rotary encoders based on the output of magnetic rotary encoders on the corresponding measuring rod; the main control modules are further used to acquire the radius of the arbor tree at a set point position according to the lengths of two telescopic rods in the corresponding measuring rod and the included angle of the two ends of the measuring rods, and the set point position is a contact position of the connecting ends of the two telescopic rods in the corresponding measuring rod and the trunk;
- the main control modules are further used to acquire the tree sap flow rate corresponding to different radial depths according to instantaneous voltage differences generated by the probe sampling modules at different radial depths.

2. The measuring device for a single grass tree according to claim 1, wherein the end, provided with the magnetic rotary encoder, of the first measuring rod is connected with the end, not provided with the magnetic rotary encoder, of the second measuring rod; in the two adjacent second measuring rods, the end, provided with the magnetic rotary encoder, of one second measuring rod is connected with the end, away from the magnetic rotary encoder, of the other second measuring rod.

3. The measuring device for a single grass tree according to claim 2, wherein the probe sampling module comprises a three-section type thermal dissipation probe, an ADC module and a STC processor; the three-section type thermal dissipation probe comprises:

- a first probe and a second probe which are arranged in parallel; each of the first probe and the second probe comprises a thermocouple group; the first probe further comprises a heating resistor; the thermocouple group comprises a plurality of thermocouples arranged at equal intervals; one end of the thermocouple is grounded, and the other end of the thermocouple is connected into the ADC module;
- the ADC module is used to measure the instantaneous voltage of each thermocouple and transmit the instantaneous voltage to the STC processors; and
- the STC processor computes the instantaneous voltage difference corresponding to the thermocouple pair based on the instantaneous voltages of the thermocouples of the first probe and the second probe at the same radial depth, and transmits the instantaneous voltage difference to the main control modules.

4. The measuring device for a single grass tree according to claim 3, wherein the main control modules are arranged at the connecting end of the two telescopic rods in the corresponding measuring rod; and the probe sampling modules are arranged on the main control modules.

5. The measuring device for a single grass tree according to claim 3, wherein the main control modules are also used to acquire the radius of the arbor tree at the set point position according to the lengths of two telescopic rods in the corresponding measuring rod and the included angle of the two ends of the measuring rod, and the acquisition formula is:

$$R = \frac{x1 + x2 - \frac{W}{2\tan(a)} - \frac{W}{2\tan(b)}}{\cot\left(\frac{a}{2}\right) + \cot\left(\frac{b}{2}\right)};$$

in the formula, x1 and x2 represent the length of the first telescopic rod and the second telescopic rod, respectively; w represents the vertical distance from the contact position of the corresponding three-section type thermal dissipation probe and the tree trunk to the central axis of the measuring rod; a represents the included angle of one end of the measuring rod; b represents the included angle of the other end of the measuring rod; and R represents the grass tree radius corresponding to the contact position of the three-section type thermal dissipation probe and the tree trunk.

6. The measuring device for a single grass tree according to claim 5, wherein the main control modules are further used to acquire the tree sap flow rate corresponding to different radial depths according to instantaneous voltage differences generated by the probe sampling modules at different radial depths, and the acquisition formula is:

$$V = 0.0119 \times \left(\frac{dU\max - dU}{dU}\right)^{1.231} \times 3600;$$

in the formula, dU represents instantaneous voltage difference corresponding to the radial depth that is to be solved currently; $dU_{max}$ is the maximum instantaneous voltage difference in the instantaneous voltage differences generated at all the radial depths; and V represents the tree sap flow rates corresponding to the radial depth that is to be solved currently.

7. The measuring device for a single grass tree according to claim 6, wherein the magnetic rotary encoder comprises a rotating shaft, a base, a permanent magnet and an encoder chip; the rotating shaft is rotationally mounted in the base by means of a bearing assembly; the permanent magnet is fixedly connected to the rotating shaft; and the encoder chip is fixed to the base.

8. The measuring device for a single grass tree according to claim 7, wherein the encoder chip comprises a micro-processing module, a first Wheatstone bridge and a second Wheatstone bridge; any Wheatstone bridge comprises a first TMR element, a second TMR element, a third TMR element and a fourth TMR element; one end of the first TMR element is connected to one end of the second TMR element and then connected into a power supply voltage Vcc; the other end of the second TMR element is connected to one end of the fourth TMR element and then connected into a second node; the other end of the fourth TMR element is connected to one end of the third TMR element and then grounded; and the other end of the third TMR element and the other end of the first TMR element are connected into a first node.

9. The measuring device for a single grass tree according to claim 8, wherein, the first Wheatstone bridge is used to generate a first voltage signal and a second voltage signal when the rotating shaft rotates by 0-360 degrees, and input into the micro-processing modules through the corresponding first node and second node;

the second Wheatstone bridge is used to generate a third voltage signal and a fourth voltage signal when the rotating shaft rotates by 0-360 degrees, and input the signals into the micro-processing modules through the corresponding first node and second node;

a first voltage curve and a second voltage curve are two paths of orthogonal sine waves; the first voltage curve is a voltage curve formed by differential voltage of the first voltage signal and the second voltage signal; and the second voltage curve is a voltage curve formed by differential voltage of the third voltage signal and the fourth voltage signal.

10. The measuring device for a single grass tree according to claim 9, wherein the micro-processing module comprises a filter, an analog-to-digital converter and a microprocessor;

the filter is used to receive the first voltage signal, the second voltage signal, the third voltage signal and the fourth voltage signal, filter the signals and input the signals into the analog-to-digital converter;

the analog-to-digital converter is used to convert the continuously changing first voltage signal, second voltage signal, third voltage signal and fourth voltage signal into discrete digital signals respectively, and input the signals into the microprocessor;

the microprocessor is used to generate two paths of orthogonal A digital pulse signals and B digital pulse signals through the discrete digital signals corresponding to the first voltage signal and the second voltage signal and the discrete digital signals corresponding to the third voltage signal and the fourth voltage signal, and Z pulse signals, and input the signals into the main control modules; and the Z pulse signals are generated once when the rotating shaft rotates by one circle and passes through a specific reference point.

11. The measuring device for a single grass tree according to claim 10, wherein the differential voltage of the first voltage signal and the second voltage signal is calculated according to the following formula:

$$UA = U_{A+} - U_{A-} = Vcc\left(\frac{R3}{R1 + R3} - \frac{R4}{R2 + R4}\right);$$

In the formula, $U_{A+}$ represents the first voltage signal outputted by the first node A+ in the first Wheatstone bridge; $U_{A-}$ represents the second voltage signal outputted by the second node A− in the first Wheatstone bridge; Vcc represents the power supply voltage of the first Wheatstone bridge; $R_1$ and $R_3$ represent the resistances of the first TMR element and the third TMR element in the first Wheatstone bridge, respectively; $R_2$ and $R_4$ represent the resistances of the second TMR element and the fourth TMR element in the first Wheatstone bridge, respectively; and $U_A$ represents the differential voltage of the first voltage signal and the second voltage signal.

12. The measuring device for a single grass tree according to claim 10, wherein the differential voltage of the third voltage signal and the fourth voltage signal is calculated according to the following formula:

$$UB = U_{B+} - U_{B-} = Vcc\left(\frac{R7}{R5+R7} - \frac{R8}{R6+R8}\right);$$

In the formula, $U_{B+}$ represents the third voltage signal outputted by the first node B+ in the second Wheatstone bridge; $U_{B-}$ represents the fourth voltage signal outputted by the second node B− in the second Wheatstone bridge; Vcc represents the power supply voltage of the second Wheatstone bridge; $R_5$ and $R_7$ represent the resistances of the first TMR element and the third TMR element in the second Wheatstone bridge, respectively; $R_6$ and $R_8$ represent the resistances of the second TMR element and the fourth TMR element in the second Wheatstone bridge, respectively; and $U_B$ represents the differential voltage of the third voltage signal and the fourth voltage signal.

13. The measuring device for a single grass tree according to claim 12, wherein the main control module further comprises a first counter T0 and a second counter T1.

14. The measuring device for a single grass tree according to claim 13, wherein the main control modules acquire the included angle between two connected measuring rods corresponding to the magnetic rotary encoders based on the output of magnetic rotary encoders on the corresponding measuring rod, specifically comprising:

the main control modules detect rising edges or falling edges of the A digital pulse signals and the B digital pulse signals;

the first counter T0 counts in an increasing manner when the main control modules detect that the A digital pulse signals lead the B digital pulse signals and detect the rising edge of one A digital pulse signal, and counts in a decreasing manner when the main control modules detect that the B digital pulse signals lead the A digital pulse signals and detect one B digital pulse signal;

the second counter T1 counts in an increasing manner when the Z pulse signals generate one pulse; and the main control modules compute the included angle between the two connected measuring rods corresponding to the magnetic rotary encoders through a counting value corresponding to the A digital pulse signals, a counting value corresponding to the B digital pulse signals and a counting value of the second counter.

15. The measuring device for a single grass tree according to claim 14, wherein a formula for computing the included angle between two connected measuring rods corresponding to the magnetic rotary encoders is:

$$A_{included\ angle} = (\text{counting difference}_{T0} \times \text{minimum angle unit}) + (\text{counting value}_{T1} \times 360°);$$

in the formula, the counting $\text{difference}_{T0}$ is a difference value between the counting value corresponding to the A digital pulse signals and the counting value corresponding to the B digital pulse signals; the minimum angle unit is an angle represented by each counting increment of the magnetic rotary encoders; the counting $\text{value}_{T1}$ represents the counting value of the second counter; 360° represents the degree of one circle; and the $A_{included\ angle}$ represents an angle of the magnetic rotary encoders rotating from an initial position to a current position.

* * * * *